(12) United States Patent
Hakala et al.

(10) Patent No.: US 10,482,078 B2
(45) Date of Patent: Nov. 19, 2019

(54) METHODS AND DEVICES FOR HANDLING HASH-TREE BASED DATA SIGNATURES

(71) Applicant: Telefonaktiebolaget L M Ericsson (publ), Stockholm (SE)

(72) Inventors: Harri Hakala, Turku (FI); Mikael Jaatinen, Raisio (FI); Hannu Lehtinen, Turku (FI); Leena Marjatta Mattila, Turku (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 134 days.

(21) Appl. No.: 14/765,602

(22) PCT Filed: Jun. 30, 2015

(86) PCT No.: PCT/SE2015/050767
§ 371 (c)(1),
(2) Date: Aug. 4, 2015

(87) PCT Pub. No.: WO2017/003331
PCT Pub. Date: Jan. 5, 2017

(65) Prior Publication Data
US 2017/0004168 A1  Jan. 5, 2017

(51) Int. Cl.
*G06F 17/00* (2019.01)
*G06F 7/00* (2006.01)
(Continued)

(52) U.S. Cl.
CPC ...... *G06F 16/2365* (2019.01); *G06F 16/2246* (2019.01); *G06F 16/2255* (2019.01);
(Continued)

(58) Field of Classification Search
CPC ......... G06F 17/30371; G06F 17/30327; G06F 17/3033; H04L 9/006; H04L 9/007; H04L 9/3247
(Continued)

(56) References Cited

U.S. PATENT DOCUMENTS 7,281,205 B2 * 10/2007 Brook ............... G06F 17/2247
705/50
7,404,186 B2 * 7/2008 Massarenti ........... G06F 9/4493
719/311
(Continued)

FOREIGN PATENT DOCUMENTS

JP  2002185941 A  6/2002
JP  2003186726 A  7/2003
(Continued)

OTHER PUBLICATIONS

Buldas, A., et al., "Keyless Signatures' Infrastructure: How to Build Global Distributed Hash-Trees", International Association for Cryptologic Research; vol. 20131216:190753, Dec. 16, 2013, pp. 1-9, XP0601015230.
(Continued)

*Primary Examiner* — Pavan Mamillapalli
(74) *Attorney, Agent, or Firm* — Rothwell, Figg, Ernst & Manbeck, P.C.

(57) ABSTRACT

The disclosure relates to a method (30) of handling a hash-tree based data signature. The method (30) is performed in a first device (13, 13a) and comprises: receiving (31), from a second device (12, 12a, 12b), a data signature generation request, the request comprising an indication on type of storage of a generated data signature; generating (32), in response to the data signature generation request, the data signature B using a hash-tree based data signing method; and providing (33), to the second device (12, 12a, 12b), a reference C to the generated data signature, wherein (Continued)

the generated data signature is obtainable by means of the reference C. The disclosure also relates to a method in a second device, corresponding devices, computer programs and computer program products.

24 Claims, 6 Drawing Sheets

(51) Int. Cl.
*G06F 16/23* (2019.01)
*G06F 16/22* (2019.01)
*H04L 9/00* (2006.01)
*H04L 9/32* (2006.01)

(52) U.S. Cl.
CPC ............. *H04L 9/006* (2013.01); *H04L 9/007* (2013.01); *H04L 9/3247* (2013.01)

(58) Field of Classification Search
USPC ........................................................ 707/690
See application file for complete search history.

(56) References Cited

U.S. PATENT DOCUMENTS

| | | | | |
|---|---|---|---|---|
| 8,997,248 | B1* | 3/2015 | McKay | H04L 63/0428 726/27 |
| 9,208,162 | B1* | 12/2015 | Hallak | G06F 11/2094 |
| 9,286,003 | B1* | 3/2016 | Hallak | G06F 3/0653 |
| 9,473,510 | B2* | 10/2016 | Pearce | H04W 4/029 |
| 9,614,682 | B2* | 4/2017 | Buldas | H04L 9/3247 |
| 9,853,817 | B2* | 12/2017 | LaGrone | H04L 9/3247 |
| 2005/0075986 | A1* | 4/2005 | You | H04L 63/0435 705/71 |
| 2009/0164517 | A1* | 6/2009 | Shields | G06F 21/55 |
| 2011/0246489 | A1* | 10/2011 | Pope | H04L 45/742 707/754 |
| 2012/0161154 | A1 | 6/2012 | Mimura et al. | |
| 2012/0166757 | A1* | 6/2012 | Volvovski | G06F 11/1076 711/206 |
| 2012/0324229 | A1* | 12/2012 | Buldas | H04L 9/321 713/176 |
| 2014/0245020 | A1 | 8/2014 | Buldas et al. | |
| 2015/0039893 | A1* | 2/2015 | Buldas | H04L 9/3239 713/176 |
| 2015/0052615 | A1 | 2/2015 | Gault et al. | |
| 2015/0295720 | A1* | 10/2015 | Buldas | H04L 9/3247 713/176 |

FOREIGN PATENT DOCUMENTS

| | | |
|---|---|---|
| JP | 2006079598 A | 3/2006 |
| JP | 2016509443 A | 3/2016 |

OTHER PUBLICATIONS

International Search Report and Written Opinion issued in International application No. PCT/SE2015/050767 dated Feb. 15, 2016, 11 pages.

* cited by examiner

METHODS AND DEVICES FOR HANDLING HASH-TREE BASED DATA SIGNATURES

CROSS-REFERENCE TO RELATED APPLICATION

This application is a 35 U.S.C. § 371 National Phase Entry Application from PCT/SE2015/050767, filed Jun. 30, 2015, and designating the United States.

TECHNICAL FIELD

The technology disclosed herein relates generally to the field of data integrity protection, and in particular to methods and devices for handling hash-tree based data signatures.

BACKGROUND

Traditional data integrity protection requires a specific tool to be installed in a client or integrated to an application. For instance, one such tool for data integrity comprises software that monitors and alerts the user of suspicious events such as certain types of file changes, thereby protecting data assets. An alternative for data integrity protection over insecure communication systems is to use a Public Key Infrastructure (PKI) based data signing technology utilizing public-private key pairs, wherein the private key is kept secret. In PKI, a digital signature is used to authenticate a message and thereby prevent the message from being altered in transit. The digital signature encrypts the message with the sender's private (signing) key and if the signature can be decrypted with the sender's associated public (verification) key it will establish the identity of the sender and verify that the message has not been altered since it was signed.

Keyless Signature Infrastructure (KSI) is a more recent hash-tree based data signing technology providing data integrity, time stamping and signer identification services. The KSI based signature technology provides an alternative solution to PKI in data integrity protection with reliable integrity proof without assuming continued secrecy of the keys. The KSI technology utilizes data hashes and hash trees for generating signature tokens for data to be integrity protected. KSI has some advantages compared to the traditional data integrity protection technology, whenever there is a need to protect integrity of massive amounts of data and/or when integrity protection of data is required for a long time. For instance, for data sets that are so large that traditional data processing applications are inadequate, so called Big Data, KSI technology suits better than PKI technology.

KSI technology is an excellent choice for integrity protection in, for instance, a machine-to-machine environment (e.g. smart-metering) and an Internet of Things (IoT) environment. A device wishing to use a KSI service needs to have an interface towards the KSI service for sending data signing requests and verification requests. The device combines the data to be protected and a KSI signature, and therefore needs to store the KSI signatures; hence, this requires that the device has large enough storage capacity. The typical size of a KSI signature is more than 3 kilobytes, and a maximum size of the KSI signature might be up to 5 kilobytes (kBs). The storage capacity becomes an issue in particular when the device generates lots of data that needs to be integrity protected by using the KSI service. For example, an average of 1000 KSI signatures generated per 24 hour will require more than 3 megabytes (MBs) data storage for the KSI signatures only.

However, such devices have typically limited amount of data storage capacity, and simply extending its storage capacity is not always feasible, e.g. for cost reasons or simply due to lack of space. Another problem, if increasing the data storage capacity in the device, is the retrieval of the signatures therefrom, which would be burdensome when needed e.g. for digital forensic investigations, since a large amount of signatures will have to be retrieved from a large amount of devices.

Furthermore, the bandwidth of a communication link has to be capable of carrying data amounts needed by the signature transfer without jeopardizing transfer of other traffic to and from the device. Smart devices, for instance, may have access to a network via a radio interface, e.g. Global System for Mobile Communications (GSM) or Wideband Code Division Multiple Access (WCMDA). Such radio interface of the smart device might not have been dimensioned for transmitting packets of the size required for the signature transfer, while also transmitting data.

The number of connected devices is growing exponentially and with such an increasing amount of machine-generated data, there is a need for scalable solutions that can provide proof of tamper- and corruption-free operation.

SUMMARY

An objective of the present disclosure is to solve or at least alleviate at least one of the above mentioned problems.

The objective is according to an aspect achieved by a method of handling a hash-tree based data signature. The method is performed in a first device and comprises: receiving, from a second device, a data signature generation request, the request comprising an indication on type of storage of a generated data signature; generating, in response to the data signature generation request, the data signature using a hash-tree based data signing method; and providing, to the second device, a reference to the generated data signature, wherein the generated data signature is obtainable by means of the reference.

The method enables the KSI service provider to offer improved services to its users. For instance, by providing the reference to a signature instead of the signature, which requires more communication resource to be used, a more efficient radio communication is offered to the KSI service user. Further, by storing the signature on behalf of the device, the device is alleviated from the requirement of a large storage capacity which is a cost efficient solution for the device owner. The method thereby provides improvements to existing KSI technology in order to better meet requirements of e.g. smart devices.

Also, the risk of the signature being lost if the device fails or is compromised, is removed by storing the signatures in the KSI network instead of in the device.

The capacity of a KSI network, which the first device may be part of, may be used in implementing a "central" signature storage making the KSI infrastructure utilization more efficient.

The objective is according to an aspect achieved by a computer program for a first device for handling hash-tree based data signatures. The computer program comprises computer program code, which, when executed on at least one processor on the first device causes the first device to perform the method as above.

The objective is according to an aspect achieved by a computer program product comprising a computer program as above and a computer readable means on which the computer program is stored.

The objective is according to an aspect achieved by a first device for handling a hash-tree based data signature. The first device is configured to: receive, from a second device, a data signature generation request, the request comprising an indication on type of storage of a generated data signature; generate, in response to the data signature generation request, the data signature using a hash-tree based data signing method; and provide, to the second device, a reference to the generated data signature, wherein the generated data signature is obtainable by means of the reference.

The objective is according to an aspect achieved by a method of handling a hash-tree based data signature. The method is performed in a second device and comprises: sending, to a first device, a data signature generation request, the request comprising an indication on type of storage of a generated data signature; and receiving, from the first device, a reference to a generated data signature in response to the request, wherein the generated data signature is obtainable by means of the reference.

The method enables efficient use of scarce radio interface resources even though the device uses KSI technology, which conventionally would involve transmission of rather large KSI signatures. In particular, since a reference to a signature is sent instead of the signature (as in prior art), fewer radio interface resources may be required and used. Further, since the signature does not need to be stored in the second device (e.g. a smart device) it is less vulnerable for illegal access. Smart devices typically reside in unsecured areas while the signature storage of the KSI network is typically located within a secured zone.

The objective is according to an aspect achieved by a computer program for a second device for handling hash-tree based data signatures. The computer program comprises computer program code, which, when executed on at least one processor on the second device causes the second device to perform the method as above.

The objective is according to an aspect achieved by a computer program product comprising a computer program as above and a computer readable means on which the computer program is stored.

The objective is according to an aspect achieved by a second device for handling a hash-tree based data signature. The second device is configured to: send, to a first device, a data signature generation request, the request comprising an indication on type of storage of a generated data signature; and receive, from the first device, a reference to a generated data signature in response to the request, wherein the generated data signature is obtainable by means of the reference.

Further features and advantages of the embodiments of the present teachings will become clear upon reading the following description and the accompanying drawings.

DETAILED DESCRIPTION

Figure 1:
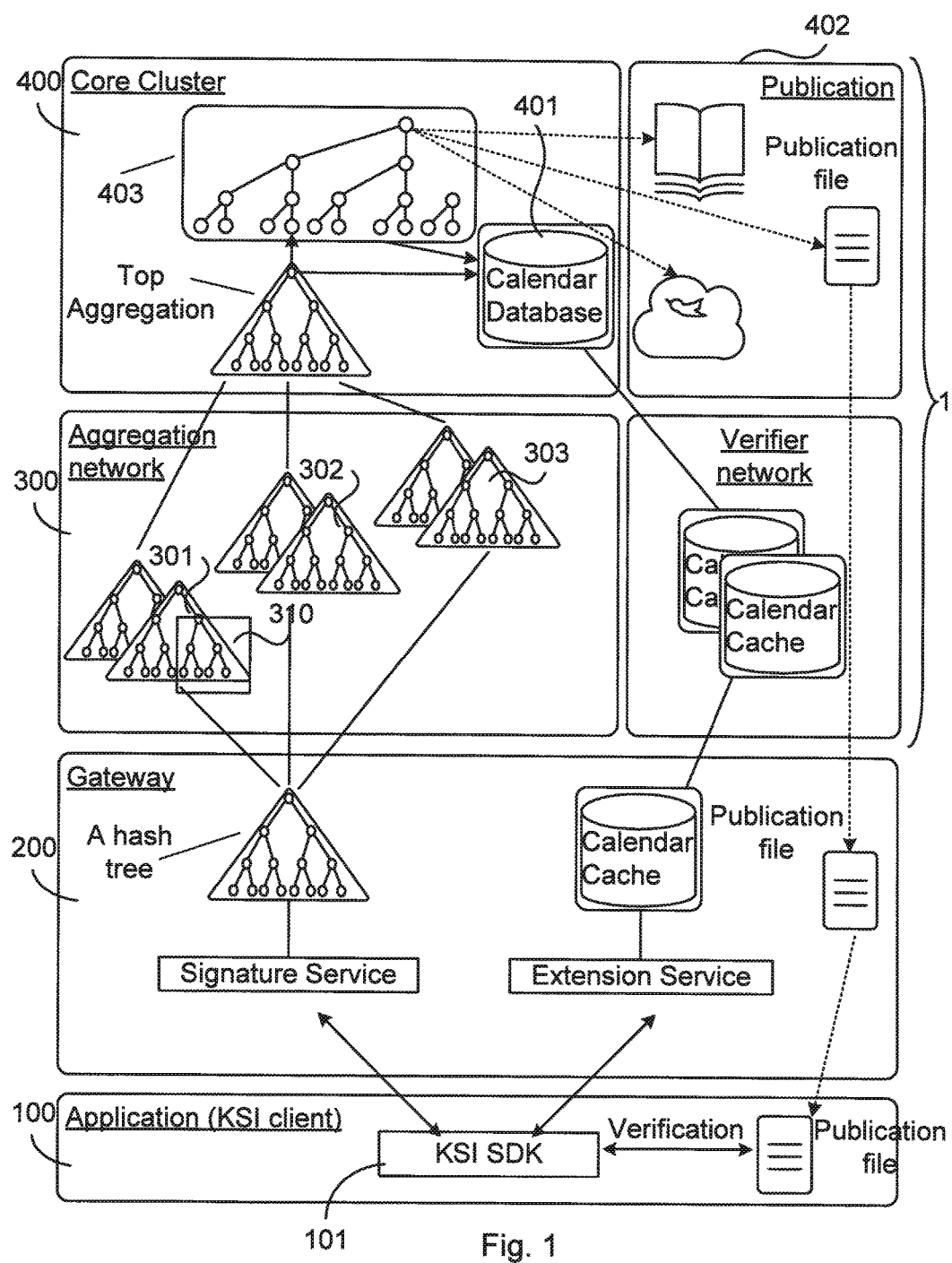
FIG. 1 illustrates a keyless signature infrastructure system.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

For sake of completeness and for providing a thorough understanding of the present teachings, description on some basics of Keyless Signature Infrastructure (KSI) technology is initially provided.

FIG. 1 illustrates components of a KSI architecture and is also an environment in which aspects of the present teachings may be implemented. A KSI network comprises four main layers.

A first layer is a KSI user application layer 100 for KSI adapted applications. The KSI adapted application 100 (in the following also denoted KSI application or KSI client) is the source of data to be signed by the use of the KSI network 1. The KSI application 100 integrates a Keyless Signature Infrastructure Software Development Kit (KSI SDK) 101 Application Programming Interface (API) in order to communicate with a signing service and extension/verification service of a KSI gateway layer 200. In KSI, the data to be signed is hashed by the KSI application 100 and the hash value is sent to the KSI network 1 for getting a signature for it. In the context of signature request, it is noted that the data itself is not sent out from the KSI application 100, only the hash value of it.

The KSI application 100 may use any type of cryptolibrary for generating data hashes or it may utilize a hash function support of the KSI SDK. As mentioned in the background section, in order to be able to provide the integrity verification of a data, the KSI application must, according to prior art, store the signature token and link it to the respective data item somehow, e.g. with metadata, or by storing signature token with the data item. The present teachings remove this requirement by instead storing the signature in the KSI network 1 and providing the KSI application 100 with a reference to the signature.

A second layer is the gateway layer 200. The KSI gateway (GW) provides an interface between the KSI application 100 and the KSI network 1 and handles data signing and verification/extension requests from the KSI application 100. The KSI GW implements the first level of a global aggregation hash-tree aggregating data hashes sent from the KSI application 100. From the KSI GW the signing request proceeds to an aggregation network layer 300 using e.g. a User Datagram Protocol (UDP) based protocol. Signing requests are sent to all parent aggregators 301, 302, 303 in a cluster serving the particular KSI GW.

A third layer is the aggregation network layer 300. In KSI, a component hash tree denoted aggregator is used and each aggregator acts asynchronously. In FIG. 1, one such aggregator is indicated at reference numeral 310. The aggregator 310 takes hash values as input, generates a root hash value and sends the root hash value to one or more parent aggregators.

A root hash from the first level of global aggregation, also denoted gateway level aggregation, is sent to the aggregation network No. The aggregation network 300 comprises distributed aggregation servers called aggregators, which comprise a global distributed aggregation network. For resiliency reasons the aggregators may be deployed as server clusters. Each cluster member receives the same input request from the child aggregators and they run independently in an unsynchronized manner. The aggregation network layer 300 is a second level of aggregation.

A fourth layer is a core cluster layer. The core cluster 400 comprises geographically distributed servers located in different data centers and implements a top level aggregation hash-tree, a calendar hash-tree, a calendar database 401 and publication functions 402. Top root hash values that are generated by the aggregation network 300 are stored in the calendar database 401 e.g. once per second. The calendar hash-tree 403 is a special type of hash-tree built using top root hash values of the top aggregation hash-tree (only one illustrated in FIG. 1) as leaf nodes, one leaf for each second. The publication function 402 is a set of values comprising publication code and publication check-times periodically published in printed and electronic media (e.g. Internet) and stored in a publication file. The publication code is a string of characters used to verify a signature.

Figure 2:
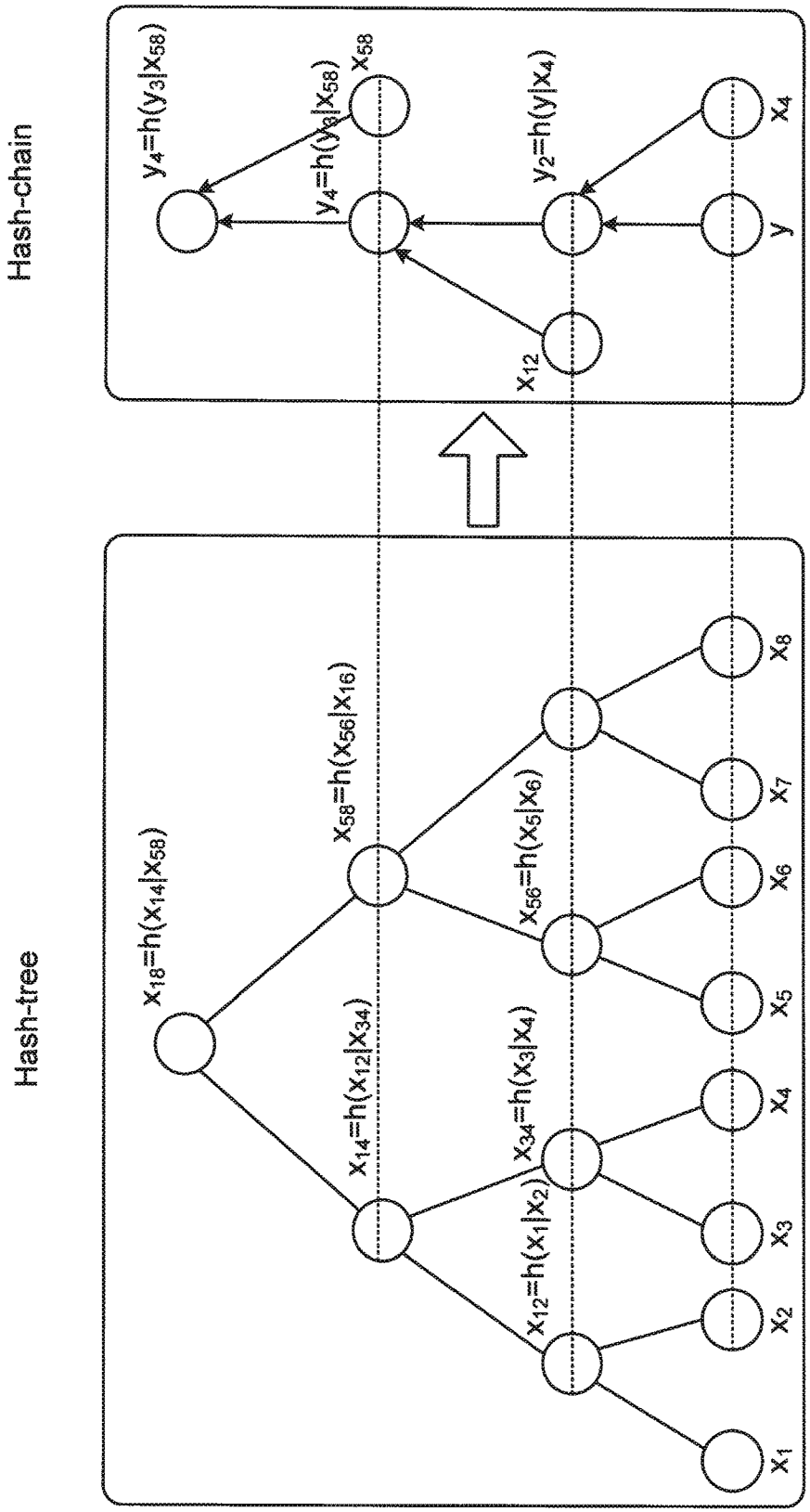
FIG. 2 illustrates a hash-chain in a verification process.

FIG. 2 illustrates a hash-chain in a verification process, and provides also a brief description of structuring principles of hash chains.

A KSI device sends a hash of a data asset, e.g. a document, to the KSI service and receives a data signature token, which is proof that the data existed in a certain form at the given time and that the request was received through a specific access point. All received requests are aggregated together into a large hash tree. The signature token contains data for reconstructing a path through the hash tree starting from a signed hash value (a leaf, e.g. $X_3$ of FIG. 2) to the top hash value ($X_{18}$ of FIG. 2). For example, letting $X_3$ indicate the original data hash and y a new hash value of the same data of which integrity is to be verified. Then nodes $X_4$, $X_{12}$ and $X_{58}$ are needed with concatenation order information for generating $y_4$, as illustrated by the hash-chain on right hand-side of FIG. 2. That is, y is first concatenated with $X_4$ and a hash value $y_2=h(y|X_4)$ is calculated, which is used as input to the next hash step with $X_{12}$, giving $y_4$ and so on. If $y_4=X_{18}$, then y must be equal with $X_3$ and thus $X_3$ must have been a part of the original hash-tree proofing that the data over which the hash $X_3$ vas generated has not been changed. Hence, if $y_4=X_{18}$, then it is safe to assume that $y_4$ was in the original hash tree (left-hand side of FIG. 2).

With reference again to FIG. 1, the aggregation network structure is illustrated on a high level. The lowest level aggregation hash-tree of the aggregation network 300 receives root hashes from a number of gateways, set those as leafs of its hash-tree and aggregates these to the new root hash value in line with principles described above with reference to FIG. 2. The new root hash is then sent to the next upper level aggregation hash-tree (parent aggregator) generating the next root hash (3rd level aggregation) respectively. The top root hash generated by this aggregation level is then sent to the core cluster 400 where the final top level aggregation is performed.

For redundancy reasons a root hash from a child aggregator is sent to several parent aggregators in an aggregator cluster. The first response from an upper level aggregator is accepted and subsequent responses are discarded by a child aggregator.

As mentioned briefly, the present teachings suggest to instead of returning the actual KSI signature to the device that owns the data and uses a KSI network for protecting it, only a reference to the signature is returned while the signature itself is stored in the KSI network.

As an additional option, and in accordance with the present teachings, particularly for devices that do not have enough storage capacity for storing their data, the data itself can also be stored together with the signature in the KSI network, e.g. in a signature database. The data itself may be stored in the KSI network also on behalf of devices having the storage capacity, e.g. for security reasons.

When the integrity of the data needs to be verified, the KSI enabled device and/or its data receiving end which is also adapted to use KSI, may use the reference to the signature to obtain the signature from the KSI network storage.

Figure 3:
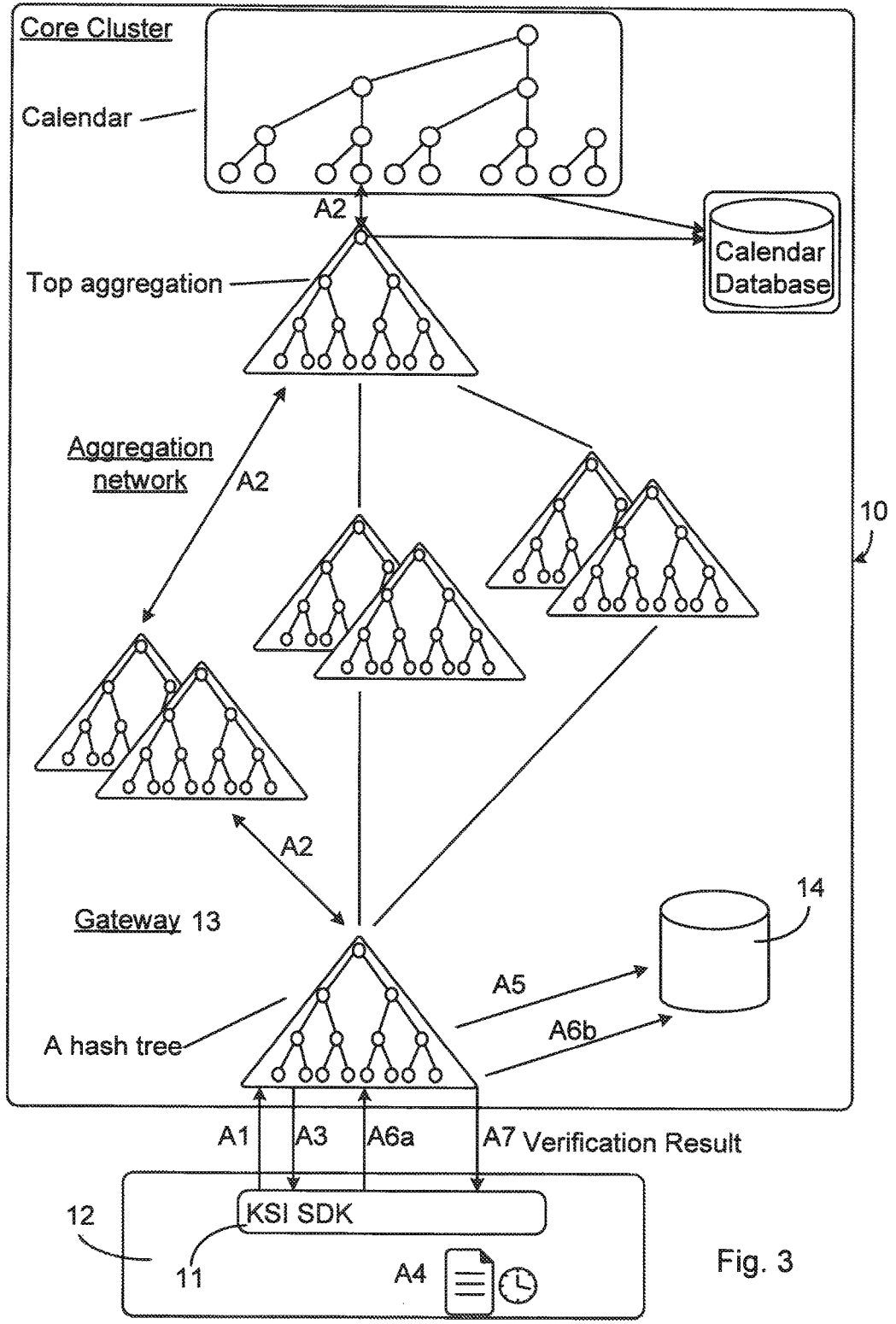
FIG. 3 illustrates signaling flow between components according to embodiments of the present teachings.

FIG. 3 illustrate various aspects of the present teachings. A KSI network 10 is illustrated comprising a first device 13, e.g. a gateway, receiving and handling KSI signing requests and verification requests. The first device 13, in the following exemplified by a KSI gateway 14, is arranged for communication with KSI clients 12.

The KSI network 10 may comprise one or more data storages 14. Such data storage 14 may be used for enabling the KSI network 10 operator to offer services such as storing data assets on behalf of KSI clients, as mentioned.

The KSI network 10 may also comprise a number of servers, virtual machines and other processing devices, gateways etc. for providing a hash-based data signing technology, e.g. as described e.g. with reference to FIGS. 1 and 2. The KSI network 10 may hence comprise a core cluster, an aggregation network, and a verifier network (exemplified by a calendar database in FIG. 3). Details of the KSI network 10, such as number of layers of aggregations servers, is not important for the present teachings, and may be according to a conventional KSI network such as described with reference to FIGS. 1 and 2. The KSI network 10 may comprise still further conventional components, not illustrated, such as e.g. publication functions.

A second device 12 is also illustrated in FIG. 3, which is typically not part of the KSI network 10. The second device 12 is a KSI client seeking the services provided by the KSI network 10. The KSI client 12, also denoted KSI adapted client or KSI application, integrate a KSI Software Development Kit (SDK) 11 (Application Programming Interface, API). The KSI SDK 11 provides an interface that is needed towards a KSI service provided by the KSI network 10. A data signing request is sent from the KSI client 12 via the KSI SDK 11, which also provides data validation logic and the needed verification interface towards the KSI network 10. The KSI SDK 11 is responsible for combining the data and the KSI signature, and for storing the KSI signature, or as according to embodiments of the present teachings, for storing a KSI reference to a signature.

The KSI client 12 may for instance be any type of Internet of Things (IoT) device, i.e. any type of device with connectivity to Internet, typically wireless connectivity. The KSI client 12 may for instance comprise a so-called smart device, which may refer to any device or application connected to the Internet and/or to a mobile network. The KSI client 12 may comprise a device of a smart grid, i.e. an electrical grid using communications technology to gather (and act on) information. Other examples on KSI clients 12 comprise heart monitoring implants, sensor devices of sensor networks etc.

It is noted that the KSI client 12 need not have Internet connectivity, it needs to be able to communicate with the KSI network 10, e.g. with the KSI gateway 13 thereof. The KSI client 12 may for instance communicate with the KSI gateway 13 over a mobile communications network using, for instance, a radio interface such as a GSM, WCDMA, Long Term Evolution (LTE), 3G, 4G, 5G or access technologies such as those of the IEEE 802.11 (Wireless Local Area Network, WLAN) or 802.16 (WiMAX) families or still other wireless communication systems. The KSI client 12 may communicate with the KSI gateway 13 indirectly, via one or more intermediated devices (as exemplified with reference to FIG. 4). For instance, if the KSI client 12 is a sensor device of a sensor network, it may communicate with a gateway of the sensor network, e.g. over WLAN. The gateway of the sensor network then communicates (directly or indirectly via other devices) with the KSI network 10, and may provide a first level aggregation.

Next, various aspects of the present teachings are described, with reference still to FIG. 3.

A KSI client 12, for instance a sensor device, has some data asset to be protected and uses the KSI network 10 for accomplishing this. The data asset may comprise any piece of information, e.g. measurement values, documents or other data.

At arrow indicated by A1, the KSI SDK 11 of the KSI client 12 therefore sends a signing request for requesting a signature generation. The signature that is to be generated may be used by the KSI client 12 for protecting the data asset. The signing request is sent to the KSI gateway 13.

The signing request comprises, according to the present teachings, also an indication on that the KSI device 12 would like a network based signature storage. That is, an indication that the KSI network 10 is to store the signature that it generates for the KSI device 12. As an example, an indicator $I_{NW\_Storage}$ may be defined, that indicates whether or not the KSI device 12 wishes to have the network based signature storage. If, for instance, the indicator $I_{NW\_Storage}$ is set then the KSI device 12 would like the signature to be stored by the KSI network 10, and if not set, then the KSI device 12 itself stores the signature that the KSI network to generates. The signing request may hence comprise the indicator $I_{NW\_Storage}$ set accordingly. The indicator $I_{NW\_Storage}$ defines "network based signature storage requested".

At arrows indicated by A2, the KSI network 10 processes the signature request in upstream and downstream in a conventional way (i.e. according to existing KSI technology), e.g. as have been described with reference to FIGS. 1 and 2.

At arrow indicated by A3, since the new indicator $I_{NW\_Storage}$ is set, the KSI gateway 13 returns to the KSI device 12 (in particular the KSI SDK 11 thereof) only a reference to the generated KSI data signature, instead of returning the complete KSI data signature. The reference may comprise a hash value of the signature, a combination of a hash value and a timestamp indicating the aggregation time or just a hash value alone.

In order to integrity protect the reference that the KSI device 12, or rather the KSI SDK 11 thereof, receives and stores, a hash of the reference can be calculated and stored in the KSI gateway 13 together with the corresponding KSI data signature.

At A4, the KSI device 12 (KSI SDK 11 thereof) combines the original data with the received reference and stores the information.

At arrow A5, the signature is stored in the KSI network 10, e.g. in the data storage 14. The KSI gateway 13 may be pre-configured with a new parameter "Network storage address for KSI signatures". This information may be used to determine the storage location of the signature. The KSI gateway 13 may, using the suggested parameter "Network storage address for KSI signature", find a signature corresponding to a reference.

At arrows indicated by A6a, A6b, signature verification is performed. At the signature verification, the KSI device 12 sends (arrow A6a) the hash of the original data and the stored reference to the KSI gateway 13. The KSI gateway 13 uses (arrow A6b) the reference to correlate with the full signature, which is stored in the data storage 14, and triggers a verification request. In some embodiments, the verification request may comprise an indication that the signature is stored centrally in order for indicating to the KSI gateway 13 that it should retrieve the signature. In other embodiments, the KSI SDK may be adapted such that the KSI gateway 13 understands how to handle a missing KSI signature in a verification request, e.g. to check if it is the case of a network based storage of the signature.

The KSI gateway 13 my also verify the integrity of the reference by taking a hash of the received reference and comparing it to the stored hash of the reference, or if the hash alone is used as a reference, then the KSI GW checks that the hash value received from the KSI device 12 matches the one stored inside the signature.

At arrow A7, the result of the verification request is returned to the KSI device 12.

As mentioned in the background section, the radio interface of the smart metering might not have been dimensioned for transmitting large packet size. To avoid consuming radio resources by sending rather large size KSI data signatures back and forth over radio interfaces during the smart meter reading process the KSI data signature can be kept on the network based signature storage (e.g. a central metering database) during the smart meter reading process.

Figure 4:
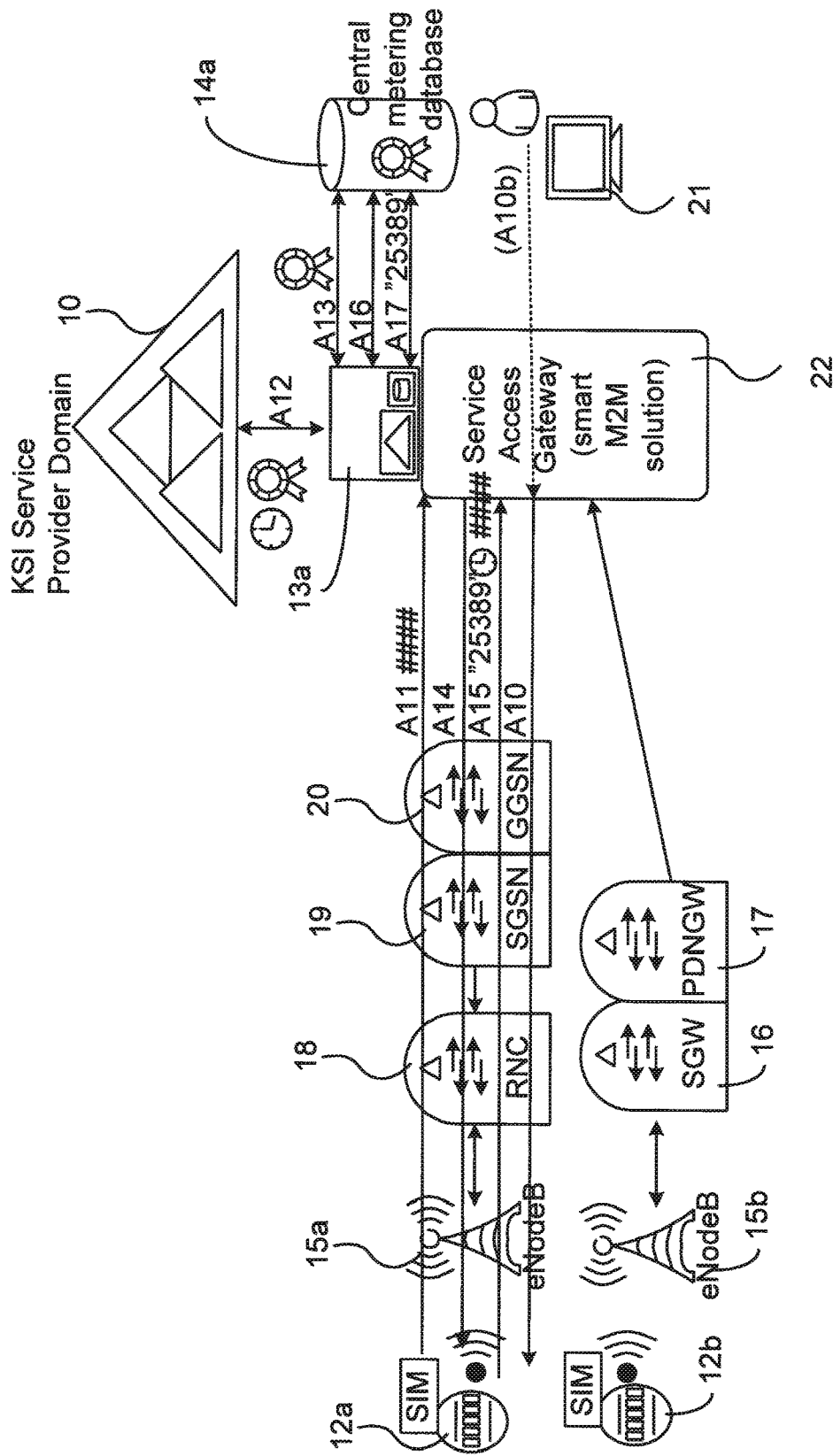
FIG. 4 illustrates an environment in which embodiments according to the present teachings may be implemented.

FIG. 4 illustrates aspects of the present teachings implemented in a smart-meter context. Two smart meters 12a, 12b are illustrated and may be arranged to communicate their data, e.g. measurement values, over a wireless communications network. In the FIG. 4 the wireless communications network is exemplified by a LTE network. The smart meters 12a, 12b may therefore comprise an interface and other means for communicating with network nodes 15a, 15b, e.g. eNodeBs, of the wireless communications network. In other instances, the smart meters 12a, 12b of a sensor network communicate over e.g. a WLAN with a gateway of the sensor network, which in turn communicates over e.g. the LTE network with the KSI network 10, in particular the KSI gateway 13a thereof.

At arrow A10, a smart-meter reading is initiated. The reading may be initiated automatically by a system that provides a smart-meter application, e.g. be initiated by a Service Access Gateway (indicated at reference numeral 22). The reading may alternatively be initiated (arrow A10b) manually by an administrator (indicated at reference numeral 21).

At arrow A11, the smart-meter 12a (Smart Meter application thereof) sends a signing request to the KSI gateway

13a. The signing request may go through a number of nodes before reaching the KSI gateway 13a, for instance nodes of the wireless communications network. Examples of such nodes comprise eNodeB 15a, Radio Network Controller (RNC) 18, Serving GPRS support node (SGSN) 19, Gateway GPRS support node (GGSN) 20, etc.

The signing request comprises the new information: "network based signature storage requested", according to the present teachings. This new information, the indicator $I_{NW\_Storage}$ was also described with reference to FIG. 3, and the description is valid also for the present embodiment and is therefore not repeated here.

At arrow A12, the KSI network 10 processes the signature request in upstream and downstream as in existing technology, i.e. generates the KSI data signature, which the KSI gateway 13a obtains.

At arrow A13, the received KSI data signature may, as requested, be stored in network based signature storage. In the illustrated case the generated KSI data signature is stored into a Central Metering Database 14a.

At arrow A14, since the new indicator $I_{NW\_Storage}$ is set, the KSI gateway 13a returns to the smart meter 12a only a reference to the signature instead of returning the complete KSI data signature. Thereby the consumption of the limited radio-interface resources is reduced compared to sending the complete KSI data signature.

At arrow A15 the smart meter 12a, in particular the KSI application thereof, combines the current reading (which is the data asset to be protected) with the received reference and sends them, e.g. as a hash value, to the Service Access Gateway 22.

At arrow A16, the KSI gateway 13a reads the KSI data signature from the signature storage 14a, and compares the received hash to the read KSI data signature.

At arrow A17, if the hash received from the smart meter 12a and the KSI data signature match, the meter reading results and the KSI data signature are stored to the Central Metering Database 14a.

The lower-most smart meter 12b may also use the above scheme for protecting its asset. While the upper-most smart meter 12a uses nodes of a General Packet Radio Service (GPRS) core network to communicate with the Service Access Gateway 22, the lower-most smart meter 12b communicates with the Service Access Gateway 22 by using the PDN GW 17 as the terminating gateway towards a packet data network (PDN).

In the following, the signing request and the verification request are summarized.

Signing Request

The data owner, e.g. the smart meter 12a, 12b, owns a data asset (e.g. a measurement value) to be protected. The device 12, 12a, 12b calculates a hash of the data:

$A=\text{hash(data)}$

The value A is sent to the KSI gateway 13, 13a in signing request, including in the request the indicator according to the present teachings, i.e. indicating that network stored signature is desired. The KSI gateway 13, 13a generates a signature B related to A:

$B=\text{signing}(A)$

Next, the KSI gateway 13, 13a generates a reference C to the signature B:

$C=\text{ref}(B)$

As have been described, C may be a hash of the data asset (C=A), C may be a hash of the signature, or a hash of the data+a timestamp, etc.

The KSI gateway 13, 13a may then calculate a hash of the reference C:

$D=\text{hash}(C)$

The KSI gateway 13, 13a stores A, B, C and D.

The KSI gateway 13, 13a returns the reference C to the device 12, 12a, 12b.

The device 12, 12a, 12b stores the data asset and the received reference C.

Verification Request:

The device 12, 12a, 12b calculates a hash A of the data that is to be verified:

$A=\text{hash(data)}$

The device 12, 12a, 12b then sends values A and C to the KSI gateway 13, 13a in a verification request.

The KSI gateway 13, 13a calculates a hash D' of the received reference C and hash A:

$D'=\text{hash}(A,C)$

Next, the KSI gateway 13, 13a uses reference C to find A, B, C and D in the storage and checks that the calculated value D' matches with the stored value D and that A in the verification request matches with A in storage.

Finally, the KSI gateway 13, 13a verifies received hash A against the stored signature B.

The various embodiments and features that have been described may be combined in different ways, examples of which are given in the following with reference first to FIG. 5.

Figure 5:
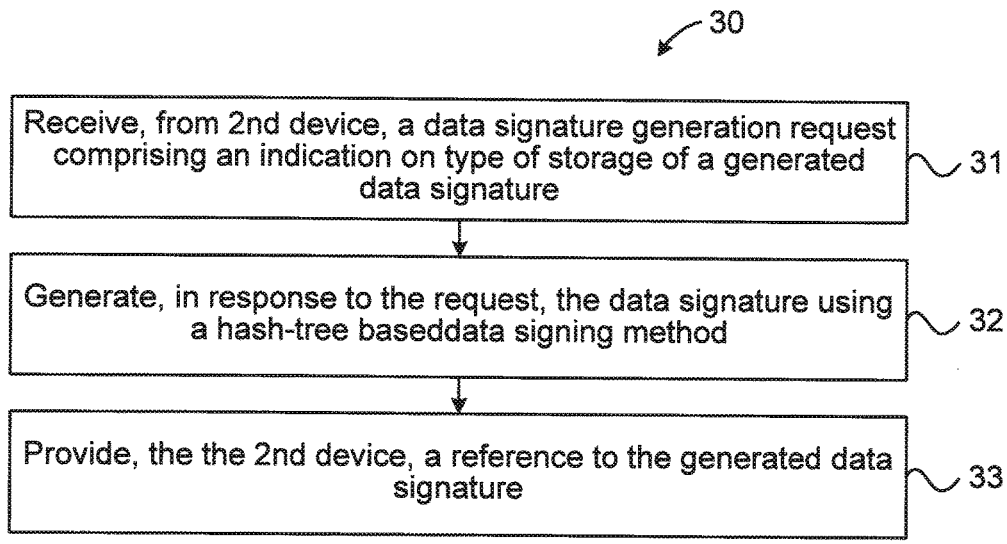
FIG. 5 illustrates a flow chart over steps of an embodiment of a method in a first device in accordance with the present teachings.

FIG. 5 illustrates a flow chart over steps of an embodiment of a method in a first device in accordance with the present teachings. The method 30 of handling a hash-tree based data signature may be performed in a first device 13, 13a such as, for instance, a gateway of a keyless signature infrastructure network 10.

The method 30 comprises receiving 31, from a second device 12, 12a, 12b (for instance a device of a sensor network), a data signature generation request. The request comprises an indication on type of storage of a generated data signature.

The method 30 comprises generating 32, in response to the data signature generation request, a data signature B using a hash-tree based data signing method.

The method 30 comprises providing 33, to the second device 12, 12a, 12b, a reference C, C=ref(B), to the generated data signature B, wherein the generated data signature B is obtainable by means of the reference C.

In an embodiment, the indication on type of storage is set to indicate storage by the first device 13, 13a and the method 30 comprises storing the generated data signature B. The storing of the generated data signature may comprise the first device 13, 13a storing the data signature in a data storage available within the first device 13, 13a or storing the data signature in a data storage external to the first device 13, 13a accessible to the first device 13, 13a.

In an embodiment, the method 30 comprises:
receiving, from the second device 12, 12a, 12b, a data signature verification request, the request comprising a hash A of a data asset (A=hash(data asset)), and the reference C to the generated data signature B (C=ref (B)),
correlating the reference C with a stored data signature B, and
verifying integrity of the data asset upon successfully correlating the reference C with the stored data signature B.

In a variation of the above embodiment, the correlating comprises:
- calculating a hash value D' (D'=hash(A, C)) of the received hash A of the data asset (A=hash(data asset) and the reference C to the generated data signature B (C=ref(B)),
- retrieving by using the received reference C the following from a data storage: a hash value A of the data asset and a hash value D of the reference C, and
- comparing calculated hash value D' with retrieved hash value D and comparing the received hash value A of the data asset with retrieved hash value A of the data asset.

In an embodiment, the providing 33 comprises:
- calculating a hash value E of the reference C to the generated data signature B (E=hash(C), C=ref(B)),
- storing the calculated hash value E of the reference C (E=hash(C)) and also storing the generated data signature B, and
- providing, to the second device 12, 12a, 12b, the hash value E of the reference C to the generated data signature B.

By providing the hash value E of the reference C, instead of providing the reference C, an even further improved security is provided. Since the first device 13, 13a stores the hash value E as well as the corresponding reference C and the corresponding data signature B, the data signature B may be easily verified by the first device 13, 13a.

In a variation of the above embodiment, the method 30 comprises:
- receiving, from the second device 12, 12a, 12b, a data signature verification request, the request comprising a hash A of a data asset (A=hash(data asset)) and the hash value E of the reference C to the generated data signature B (E=hash(C), C=ref(B)),
- correlating the received hash value E of the reference C (E=hash(C)) with a stored hash value E' of the reference C to the generated data signature B, and
- verifying integrity of the data asset upon successfully correlating the received hash value E of the reference C with the stored hash value E' of the reference to the generated data signature. That is, if E (E=hash(C)), which the first device 13, 13a receives, is equal to E' (E'=hash(C)), which it has stored previously (in particular when having calculated it), then the integrity of the data asset is verified.

In various embodiments, the method 30 comprises storing the generated data signature B together with a data asset for which the data signature B was generated.

In various devices the first device 13, 13a comprises a device of a keyless signature infrastructure 10, KSI, and the hash-tree based data signature comprises a KSI signature.

Figure 6:
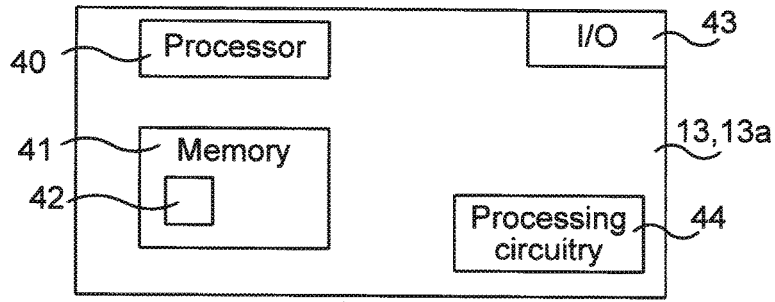
FIG. 6 illustrates schematically a first device and means for implementing embodiments of the method in accordance with the present teachings.

FIG. 6 illustrates schematically a first device and means for implementing embodiments of the method in accordance with the present teachings.

The first device 13, 13a comprises a processor 40 comprising any combination of one or more of a central processing unit (CPU), multiprocessor, microcontroller, digital signal processor (DSP), application specific integrated circuit etc. capable of executing software instructions stored in a memory 41 which can thus be a computer program product 41. The processor 40 can be configured to execute any of the various embodiments of the method for instance as described in relation to FIG. 5.

The memory 41 can be any combination of read and write memory (RAM) and read only memory (ROM), Flash memory, magnetic tape, Compact Disc (CD)-ROM, digital versatile disc (DVD), Blu-ray disc etc. The memory 41 may also comprise persistent storage, which, for example, can be any single one or combination of magnetic memory, optical memory, solid state memory or even remotely mounted memory.

The first device 13, 13a also comprises an input/output device 43 (indicated by I/O in FIG. 6) for communicating with other entities, for instance various clients wishing to have a signature generated or verified. If the first device 13, 13a is part of the KSI network 10, then the input/output device 43 may be used for communicating with other entities within the KSI network. The first device 13, 13a may also, by means of the input/output device 43, communicate with the second device 12, 12a, 12b. Such input/output device 43 of the first device 13, 13a may comprise a wireless communication interface (e.g. radio interface) and/or wired communication interface.

The first device 13, 13a may also comprise additional processing circuitry, schematically indicated at reference numeral 44, for implementing the various embodiments according to the present teachings.

The present teachings provide computer programs 42 for the first device 13, 13a. The computer program 42 comprises computer program code, which, when executed on at least one processor 40 of the first device 13, 13a causes the first device 13, 13a to perform the method 30 according to any of the described embodiments thereof.

The present disclosure also encompasses computer program products 41 comprising a computer program 42 for implementing the embodiments of the method as described, and a computer readable means on which the computer program 42 is stored. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

A first device 13, 13a for handling a hash-tree based data signature is provided. The first device 13, 13a is configured to:
- receive, from a second device 12, 12a, 12b, a data signature generation request, the request comprising an indication on type of storage of a generated data signature,
- generate, in response to the data signature generation request, the data signature B using a hash-tree based data signing method, and
- provide, to the second device 12, 12a, 12b, a reference C to the generated data signature, wherein the generated data signature is obtainable by means of the reference C.

The first device 13, 13a may be configured to perform the above steps e.g. by comprising one or more processors 40 and memory 41, the memory 41 containing instructions executable by the processor 40, whereby the first device 13, 13a is operative to perform the steps. In case of several processors 40 (not illustrated) they may be configured to perform all steps of the method 30 or only part of the steps.

In an embodiment, the indication on type of storage is set to indicate storage by the first device 13, 13a and the first device 13, 13a is configured to store the generated data signature.

In an embodiment, the first device 13, 13a is configured to:
- receive, from the second device 12, 12a, 12b, a data signature verification request, the request comprising a hash A of a data asset and the reference C to the generated data signature, correlate the reference C with a stored data signature B, and verify integrity of the data asset upon successfully correlating the reference C with the stored data signature B.

In a variation of the above embodiment, the first device 13, 13a is configured to correlate by:

calculating a hash value D' of the received hash A of the data asset and the reference C to the generated data signature, retrieving by using the received reference C the following from a data storage: a hash value A of the data asset and a hash value D of the reference C, and comparing calculated hash value D' with retrieved hash value D and comparing the received hash value A of the data asset with retrieved hash value A of the data asset.

In various embodiments, the first device 13, 13a is configured to provide by:

calculating a hash value E of the reference C to the generated data signature B, storing the calculated hash value E of the reference C and the generated data signature B, and providing, to the second device 12, 12a, 12b, the hash value E of the reference C to the generated data signature B.

In a variation of the above embodiment, the first device 13, 13a is configured to:

receive, from the second device 12, 12a, 12b, a data signature verification request, the request comprising a hash A of a data asset and the hash value E of the reference C to the generated data signature B, correlate the received hash value E of the reference C with a stored hash value E' of the reference to the generated data signature, and verify integrity of the data asset upon successfully correlating the received hash value E of the reference C with the stored hash value E' of the reference to the generated data signature.

In various embodiments, the first device 13, 13a is configured to store the generated data signature B together with a data asset for which the data signature B was generated.

In various embodiments, the first device 13, 13a comprises a device of a keyless signature infrastructure 10, KSI, and wherein the hash-tree based data signature comprises a KSI signature.

Figure 7:
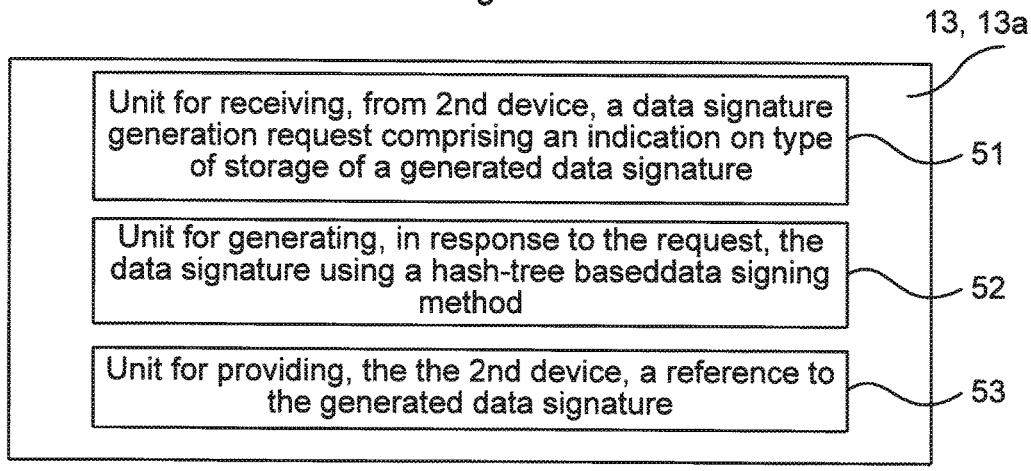
FIG. 7 illustrates a first device comprising function modules/software modules for implementing embodiments of the present teachings.

FIG. 7 illustrates a first device comprising function modules/software modules for implementing embodiments of the present teachings.

In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A first device is provided for handling a hash-tree based data signature. The first device comprises a first unit 51 for receiving, from a second device, a data signature generation request, the request comprising an indication on type of storage of a generated data signature. Such first unit 51 may for instance comprise processing circuitry for receiving such request and/or a communication interface (e.g. units 44 and/or 43 described with reference to FIG. 6).

The first device comprises a second unit 52 for generating, in response to the data signature generation request, a data signature using a hash-tree based data signing method. Such second unit 52 may for instance comprise processing circuitry (e.g. unit 44 of FIG. 6) adapted to generate data signatures using a hash-tree based data signing method.

The first device comprises a third unit 53 for providing, to the second device, a reference to the generated data signature, wherein the generated data signature is obtainable by means of the reference. Such third unit 53 may for instance comprise processing circuitry for transmitting and/or communication interface (e.g. units 44 and/or 43 described with reference to FIG. 6).

Figure 8:
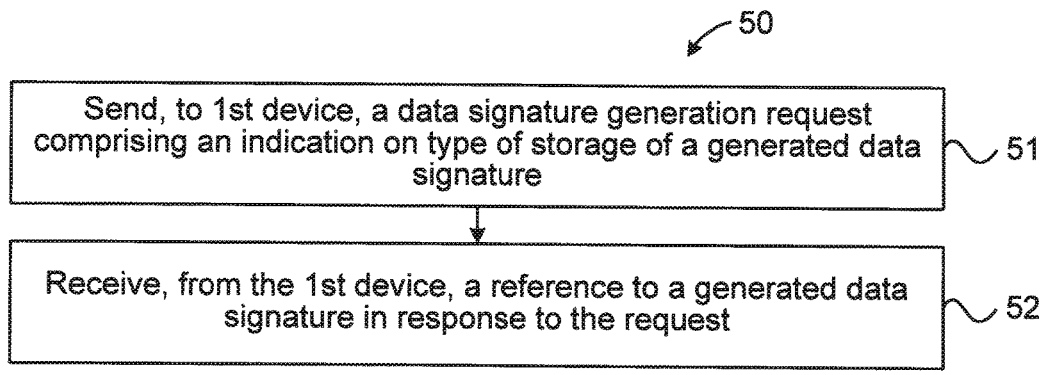
FIG. 8 illustrates a flow chart over steps of an embodiment of a method in a second device in accordance with the present teachings.

FIG. 8 illustrates a flow chart over steps of an embodiment of a method in a second device in accordance with the present teachings.

The method 50 of handling a hash-tree based data signature may be performed in a second device 12, 12a, 12b, such as, for instance, a smart device. The method 50 comprises sending 51, to a first device 13, 13a, a data signature generation request, the request comprising an indication on type of storage of a generated data signature.

The method 50 comprises receiving 52, from the first device 13, 13a, a reference C to a generated data signature B in response to the request, wherein the generated data signature B is obtainable by means of the reference C (C=ref(B)).

The method 50 enables efficient use of scarce radio interface resources even though the KSI technology is used by the first device 13, 13a if connected, for instance, to a mobile network (e.g. 3G, 4G) or to or access technologies such as those of the IEEE 802.11 (Wireless Local Area Network, WLAN) or 802.16 (WiMAX) families or other wireless communication systems. Further, since the signature is stored outside of the second device, e.g. being a smart device, the signature is less vulnerable for illegal access. Smart devices often reside in unsecured areas while the signature storage is typically located within a secured zone. Still further, data integrity verification to be done by the data receiving end becomes simpler when the signature is stored outside of the smart device. In particular, if the data receiving end makes the verification, the signature does not need to be sent to the data receiving end, but it can instead directly access it from the (central) network based storage.

In an embodiment, the method 50 comprises:

sending, to the first device 13, 13a, a data signature verification request, the request comprising a hash of a data asset and the reference to the data signature, and receiving, in response to the request, a verification of the data signature.

In an embodiment, the method 50 comprises receiving from the first device 13, 13a a calculated hash value as the reference to the generated data signature.

Figure 9:
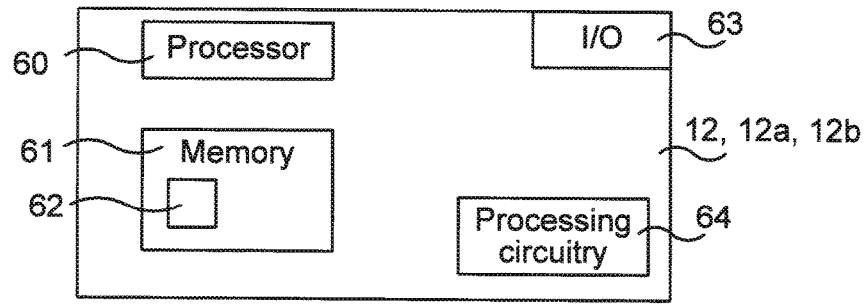
FIG. 9 illustrates schematically a second device and means for implementing embodiments of the method in accordance with the present teachings.

FIG. 9 illustrates schematically a second device 12, 12a, 12b and means for implementing embodiments of the method in accordance with the present teachings.

The second device 12, 12a, 12b comprises a processor 60 comprising any combination of one or more of a central processing unit (CPU), multiprocessor, microcontroller, digital signal processor (DSP), application specific integrated circuit etc. capable of executing software instructions stored in a memory 61 which can thus be a computer program product 61. The processor 60 can be configured to execute any of the various embodiments of the method for instance as described in relation to FIG. 8.

The memory 61 can be any combination of read and write memory (RAM) and read only memory (ROM), Flash memory, magnetic tape, Compact Disc (CD)-ROM, digital versatile disc (DVD), Blu-ray disc etc. The memory 61 may also comprise persistent storage, which, for example, can be any single one or combination of magnetic memory, optical memory, solid state memory or even remotely mounted memory.

The second device 12, 12a, 12b also comprises an input/output device 63 (indicated by I/O in FIG. 9) for communicating with other entities. For instance, in case the second device 12, 12a, 12b is a sensor device and part of a sensor network, the second device 12, 12a, 12b may communicate with other entities within the sensor network. The second device 12, 12a, 12b may also, by means of the input/output device 63, communicate with the first device 13, 13a. Such input/output device 63 of the second device 12, 12a, 12b may comprise a wireless communication interface (e.g. radio interface) and/or wired communication interface.

The second device 12, 12a, 12b may also comprise additional processing circuitry, schematically indicated at reference numeral 64, for implementing the various embodiments according to the present teachings.

The present teachings provide computer programs 62 for the second device 12, 12a, 12b. The computer program 62 comprises computer program code, which, when executed on at least one processor 60 of the second device 12, 12a, 12b causes the second device 12, 12a, 12b to perform the method 50 according to any of the described embodiments thereof.

The present disclosure also encompasses computer program products 61 comprising a computer program 62 for implementing the embodiments of the method as described, and a computer readable means on which the computer program 62 is stored. The computer program product 61 may, as mentioned earlier, be any combination of random access memory (RAM) or read only memory (ROM), Flash memory, magnetic tape, Compact Disc (CD)-ROM, digital versatile disc (DVD), Blu-ray disc etc.

A second device 12, 12a, 12b is provided for handling a hash-tree based data signature. The second device 12, 12a, 12b is configured to:

send, to a first device 13, 13a, a data signature generation request, the request comprising an indication on type of storage of a generated data signature, and receive, from the first device 13, 13a, a reference to a generated data signature in response to the request, wherein the generated data signature is obtainable by means of the reference.

The second device 12, 12a, 12b may be configured to perform the above steps e.g. by comprising one or more processors 60 and memory 61, the memory 61 containing instructions executable by the processor 60, whereby the second device 12, 12a, 12b is operative to perform the steps. In case of several processors 60 (not illustrated) they may be configured to perform all steps of the method 50 or only part of the steps.

In an embodiment, the second device 12, 12a, 12b is configured to:

send, to the first device 13, 13a, a data signature verification request, the request comprising a hash of a data asset and the reference to the data signature, and receive, in response to the request, a verification of the data signature.

In an embodiment, the second device 12, 12a, 12b is configured to receive, from the first device 13, 13a, a calculated hash value as the reference to the generated data signature. By calculating a hash of the reference to the data signature, the reference is also integrity protected, providing yet still increased data integrity.

Figure 10:
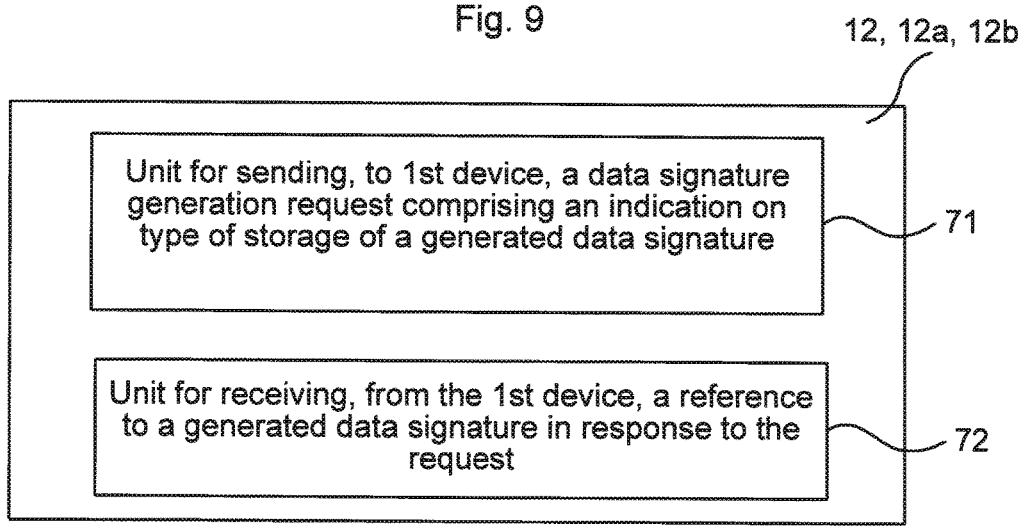
FIG. 10 illustrates a second device comprising function modules/software modules for implementing embodiments of the present teachings.

FIG. 10 illustrates a second device comprising function modules/software modules for implementing embodiments of the present teachings.

In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A second device is provided for handling a hash-tree based data signature. The second device comprises a first unit 71 for sending, to a first device, a data signature generation request, the request comprising an indication on type of storage of a generated data signature. Such first unit 71 may for instance comprise processing circuitry for sending such request and/or a communication interface (e.g. units 64 and/or 63 described with reference to FIG. 9).

The second device comprises a second unit 72 for receiving, from the first device, a reference to a generated data signature in response to the request, wherein the generated data signature is obtainable by means of the reference. Such second unit 72 may for instance comprise processing circuitry for receiving such reference and/or a communication interface (e.g. units 64 and/or 63 described with reference to FIG. 9).

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of handling a hash-tree based data signature, the method being performed in a first device and comprising:

the first device receiving, from a second device, a data signature generation request, the request comprising a storage type indicator indicating a requested storage type, wherein the storage type indicator included in the data signature generation request indicates that the second device is requesting network based storage of a data signature, the first device generating, in response to the data signature generation request, a data signature B using a hash-tree based data signing method, the first device generating a reference C to the generated data signature B, wherein the generated data signature B is obtainable by means of the reference C, the first device determining that the storage type indicator included in the data signature generation request indicates that the second device is requesting network based storage of the data signature B, and as a result of determining that the storage type indicator included in the data signature generation request indicates that the second device is requesting network based storage of the data signature B, the first device providing to the second device that transmitted the data signature request the reference C to the generated data signature B or a hash value E of the reference C.

2. The method as claimed in claim 1, wherein the data signature request further comprises a hash value A of a data asset, the generated data signature B is a signature of the hash value A, and the method further comprises the first device storing the hash value A, the data signature B, and the reference C.

3. The method as claimed in claim 1, comprising:
receiving, from the second device, a data signature verification request, the request comprising a hash A of a data asset and the reference C to the generated data signature,
correlating the reference C with a stored data signature B, and
verifying integrity of the data asset upon successfully correlating the reference C with the stored data signature B.

4. The method as claimed in claim 3, wherein the correlating comprises:
calculating a hash value D' of the received hash A of the data asset and the reference C to the generated data signature,
retrieving by using the received reference C the following from a data storage: a hash value A of the data asset and a hash value D of the reference C, and
comparing calculated hash value D' with retrieved hash value D and comparing the received hash value A of the data asset with retrieved hash value A of the data asset.

5. The method as claimed in claim 1, further comprising:
calculating the hash value E of the reference C to the generated data signature B, and
storing the calculated hash value E of the reference C and the generated data signature B, wherein
the hash value E of the reference C is provided to the second device as a result of determining that the storage type indicator included in the data signature generation request indicates that the second device is requesting network based storage of the data signature B.

6. The method as claimed in claim 5, comprising:
receiving, from the second device, a data signature verification request, the request comprising a hash A of a data asset and the hash value E of the reference C to the generated data signature B,
correlating the received hash value E of the reference C with a stored hash value E' of the reference to the generated data signature, and
verifying integrity of the data asset upon successfully correlating the received hash value E of the reference C with the stored hash value E' of the reference to the generated data signature.

7. The method as claimed in claim 1, comprising storing the generated data signature B together with a data asset for which the data signature B was generated.

8. The method as claimed in claim 1, wherein the first device comprises a device of a keyless signature infrastructure, KSI, and the hash-tree based data signature comprises a KSI signature.

9. A computer program product for a first device for handling hash-tree based data signatures, the computer program product comprising a non-transitory computer readable medium storing computer program code, which, when executed on at least one processor on the first device causes the first device to perform the method according to claim 1.

10. A first device for handling a hash-tree based data signature, the first device comprising at least one processor and a memory, wherein the memory comprises instructions which when executed by the processor causes the first device to:
receive, from a second device, a data signature generation request, the request comprising a storage type indicator indicating a requested storage type, wherein the storage type indicator included in the data signature generation request indicates that the second device is requesting network based storage of a data signature;
generate, in response to the data signature generation request, the data signature B using a hash-tree based data signing method;
generate a reference C to the generated data signature B, wherein the generated data signature B is obtainable by means of the reference C,
determine whether the storage type indicator included in the data signature generation request indicates that the second device is requesting network based storage of the data signature B, and
as a result of determining that the storage type indicator included in the data signature generation request indicates that the second device is requesting network based storage of the data signature B, provide to the second device that transmitted the data signature request the reference C to the generated data signature B or a hash value E of the reference C.

11. The first device as claimed in claim 10,
the data signature request further comprises a hash value A of a data asset,
the generated data signature B is a signature of the hash value A, and
the first device is further configured to store the hash value A, the data signature B, and the reference C.

12. The first device as claimed in claim 10, wherein the memory comprise instructions which when executed by the processor causes the first device to:
receive, from the second device, a data signature verification request, the request comprising a hash A of a data asset and the reference C to the generated data signature,
correlate the reference C with a stored data signature B, and
verify integrity of the data asset upon successfully correlating the reference C with the stored data signature B.

13. The first device as claimed in claim 12, wherein the memory comprise instructions which when executed by the processor causes the first device to correlate by:
calculating a hash value D' of the received hash A of the data asset and the reference C to the generated data signature,
retrieving by using the received reference C the following from a data storage: a hash value A of the data asset and a hash value D of the reference C, and
comparing calculated hash value D' with retrieved hash value D and comparing the received hash value A of the data asset with retrieved hash value A of the data asset.

14. The first device as claimed in claim 10, wherein the first device is further configured to:
calculate the hash value E of the reference C to the generated data signature B, and
store the calculated hash value E of the reference C and the generated data signature B, and
the hash value E of the reference C provide the hash value E of the reference C to the second device as a result of determining that the storage type indicator included in the data signature generation request indicates that the second device is requesting network based storage of the data signature B.

15. The first device as claimed in claim 14, wherein the memory comprise instructions which when executed by the processor causes the first device to:
receive, from the second device, a data signature verification request, the request comprising a hash A of a data asset and the hash value E of the reference C to the generated data signature B, correlate the received hash value E of the reference C with a stored hash value E' of the reference to the generated data signature, and verify integrity of the data asset upon successfully correlating the received hash value E of the reference C with the stored hash value E' of the reference to the generated data signature.

16. The first device as claimed in claim 10, wherein the memory comprise instructions which when executed by the processor causes the first device to store the generated data signature B together with a data asset for which the data signature B was generated.

17. The first device as claimed in claim 10, comprising a device of a keyless signature infrastructure, KSI, and wherein the hash-tree based data signature comprises a KSI signature.

18. A method of handling a hash-tree based data signature, the method being performed in a second device and comprising:

sending, to a first device, a data signature generation request for a data asset, the request comprising: a storage type indicator indicating a requested storage type and a hash A of the data asset, wherein the storage type indicator included in the data signature generation request indicates that the second device is requesting network based storage of a data signature, and receiving, from the first device and in response to the request, a reference C to a generated data signature B or a hash value E of the reference C, wherein the generated data signature B is obtainable by means of the reference C.

19. The method as claimed in claim 18, further comprising:

sending, to the first device, a data signature verification request, the request comprising a hash of a data asset and the reference to the data signature, and receiving, in response to the request, a verification of the data signature.

20. The method as claimed in claim 18, further comprising receiving from the first device a calculated hash value as the reference to the generated data signature.

21. A computer program product for a second device for handling hash-tree based data signatures, the computer program product comprising a non-transitory computer readable medium storing computer program code, which, when executed on at least one processor on the second device causes the second device to perform the method according to claim 18.

22. A second device for handling a hash-tree based data signature, the second device comprising at least one processor and a memory, wherein the memory comprises instructions which when executed by the processor causes the second device to:

send, to a first device, a data signature generation request for a data asset, the request comprising a storage type indicator indicating a requested storage type and a hash A of the data asset, wherein the storage type indicator included in the data signature generation request indicates that the second device is requesting network based storage of a data signature, and receive, from the first device and in response to the request, a reference C to a generated data signature B or a hash value E of the reference C, wherein the generated data signature B is obtainable by means of the reference C.

23. The second device as claimed in claim 22, wherein the memory comprises instructions which when executed by the processor causes the second device to:

send, to the first device, a data signature verification request, the request comprising a hash of a data asset and the reference to the data signature, and receive, in response to the request, a verification of the data signature.

24. The second device as claimed in claim 22, wherein the memory comprises instructions which when executed by the processor causes the second device to receive from the first device a calculated hash value as the reference to the generated data signature.

* * * * *

UNITED STATES PATENT AND TRADEMARK OFFICE
CERTIFICATE OF CORRECTION

PATENT NO. : 10,482,078 B2
APPLICATION NO. : 14/765602
DATED : November 19, 2019
INVENTOR(S) : Hakala et al.

Page 1 of 1

It is certified that error appears in the above-identified patent and that said Letters Patent is hereby corrected as shown below:

In the Specification

In Column 5, Line 10, delete "No." and insert -- 300. --, therefor.

In Column 6, Line 30, delete "KSI gateway 14," and insert -- KSI gateway 13, --, therefor.

In Column 7, Line 48, delete "network to" and insert -- network 10 --, therefor.

In Column 8, Line 29, delete "my" and insert -- may --, therefor.

Signed and Sealed this
Ninth Day of June, 2020

Andrei Iancu
*Director of the United States Patent and Trademark Office*